United States Patent [19]
Baird

[11] 3,985,199
[45] Oct. 12, 1976

[54] APPARATUS FOR TIMING THE FIRING OF ENERGY SOURCES

[75] Inventor: George Charles Baird, Orpington, England

[73] Assignee: Seismograph Service Corporation, Tulsa, Okla.

[22] Filed: Sept. 19, 1974

[21] Appl. No.: 507,430

[30] Foreign Application Priority Data
Sept. 20, 1973 United Kingdom............... 44248/73

[52] U.S. Cl............................... 181/107; 181/111; 235/92 PE; 235/92 T
[51] Int. Cl.²......................................... G01V 1/38
[58] Field of Search ............. 340/15.5 DP; 181/107, 181/110, 111, 120; 235/92 T, 92 PE

[56] References Cited
UNITED STATES PATENTS

| | | |
|---|---|---|
| 3,687,218 | 9/1972 | Ritter.......................... 340/15.5 DP |
| 3,704,362 | 11/1972 | Kolby et al...................... 235/92 PE |
| 3,809,864 | 5/1974 | Sampey........................... 235/92 PE |
| 3,865,305 | 2/1975 | Sampey........................... 235/92 PE |

*Primary Examiner*—H.A. Birmiel
*Attorney, Agent, or Firm*—Mason, Kolehmainen, Rathburn & Wyss

[57] ABSTRACT

Apparatus for effecting and controlling the firing of energy sources, particularly is seismic work, includes means for automatically correcting the delays between the desired and actual firing times which may be different for different sources. These means comprise a number of programmable counters for initiating the firing of different sources, a reference time counter to indicate the desired firing time or times and comparator means responsive to differences between actual and desired firing times to cause the programmable counters to bring the actual firing times towards the desired firing times.

17 Claims, 9 Drawing Figures

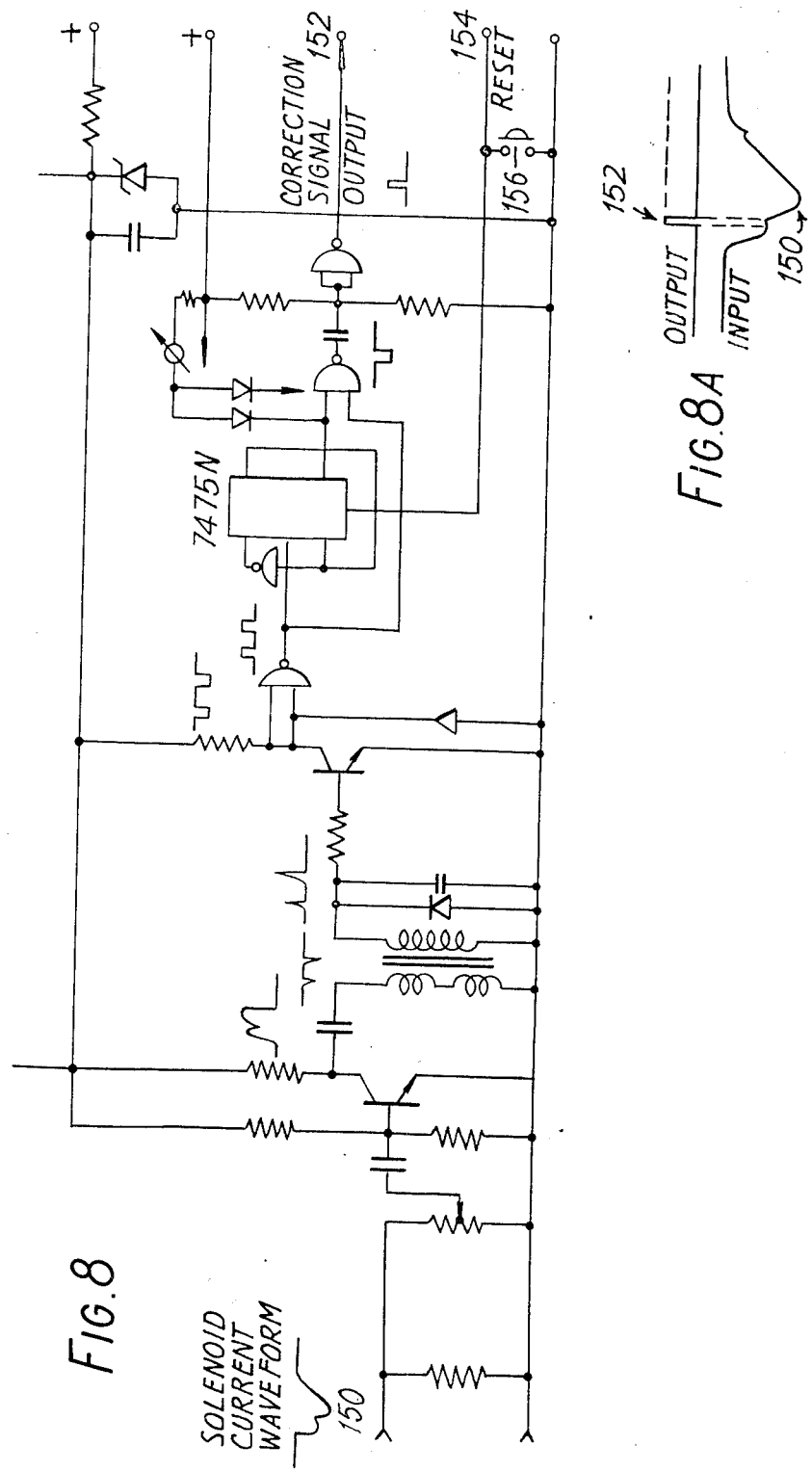

APPARATUS FOR TIMING THE FIRING OF ENERGY SOURCES

This invention relates to apparatus for effecting and controlling the firing of energy source, such as seismic energy sources which are used particularly in marine surveying. The firing of the energy sources is usually controlled by electrical circuitry.

When a plurality of seismic energy sources, such as an array of air guns, are used in marine surveying there is a requirement that every unit or group of units in the array should fire at a precise reference time, or at a precise time in relation to the firing of the other units. However there are inherent delays in the firing mechanisms, and these delays may be different in different firing mechanisms, and furthermore may vary in continued use of the apparatus.

Thus, in the case of air guns the delays may be due to differences in the time taken by actuating solenoids to fire the various air guns, differences in chamber pressures, and electrical leakages, all of which may not be constant in use.

PRIOR ART

In an attempt to achieve the firing of the guns at the correct times it has been proposed to include a variable delay circuit in each firing circuit. The variable delay is added to the inherent delay and is adjusted manually from time to time by an operator observing a pulse in the actuating solenoid current waveform on an oscilloscope in order to achieve a desired total delay. Such a system, however, requires constant monitoring to be carried on by the operator.

It is one of the objects of the present invention to provide apparatus for effecting and controlling the firing of energy sources in which the time of firing of each source can be automatically controlled.

A further object is the provision of such apparatus which is particularly intended and suitable for use in seismic surveying.

SUMMARY OF THE INVENTION

According to one aspect of the invention there is provided apparatus for effecting the firing of a number of energy sources, comprising programmable counters adapted to initiate firing of the energy sources after programmable delays which can be different for different sources, a reference time counter to provide a signal which indicates a desired firing time or times, comparator means to compare the actual firing times with said desired firing time or times, and means to program the programmable counters automatically in dependence upon information received from the comparator means to bring the actual firing times to the desired firing time or times.

Preferably each programmable counter is arranged to initiate firing of a source via a fixed delay counter which is arranged to be activated on expiration of the said programmable delay.

The comparator means may advantageously be a discriminator arranged to give "time add" or "time subtract" commands to time storage units arranged to program the said programmable counters.

The apparatus preferably includes means for providing "load," "trigger" and "clock" pulses, the load pulse causing each storage unit to load a program into its programmable counter, and the following trigger pulse opening clock gates to feed clock pulses to the programmable counter and the reference time counter.

According to another aspect of the invention there is provided apparatus for effecting the firing of one of a number of energy sources, which comprises a programmable counter adapted to commence countdown of an automatically variable delay upon the input of a clock pulse thereto, the programmable counter having an output which at the expiration of the said automatically variable delay serves to activate a second counter to initiate the countdown of a normally-fixed delay time, the second counter having an output adapted to activates an energy source firing mechanism at the expiration of the normally fixed delay time, a discriminator being provided to receive one input which indicates firing of the energy source, and another input which indicates a desired firing time, this discriminator having otputs arranged to give a "time add" or a "time subtract" command to an add/subtract circuit, the add/subtract circuit having an output which gives information to a delay time store unit, the output of which serves to program the said programmable counter upon the subsequent input of a "load" pulse to the store.

Although each energy source (or possibly a group of energy sources) is provided with its own programmable counter and discriminator a single reference time counter may be provided which has outputs to all discriminators to indicate the desired firing time or times.

The invention as applied to apparatus for controlling the firing of seismic energy sources will now be described, by way of example, with reference to the accompanying drawings in which:

DESCRIPTION OF DRAWINGS

FIG. 8 is a circuit diagram showing a circuit which can be used for shaping the gun operate signals before feeding them to the store, the shapes of the input and output pulses being shown in FIG. 8a.

DESCRIPTION OF PREFERRED EMBODIMENTS

Figure 6:
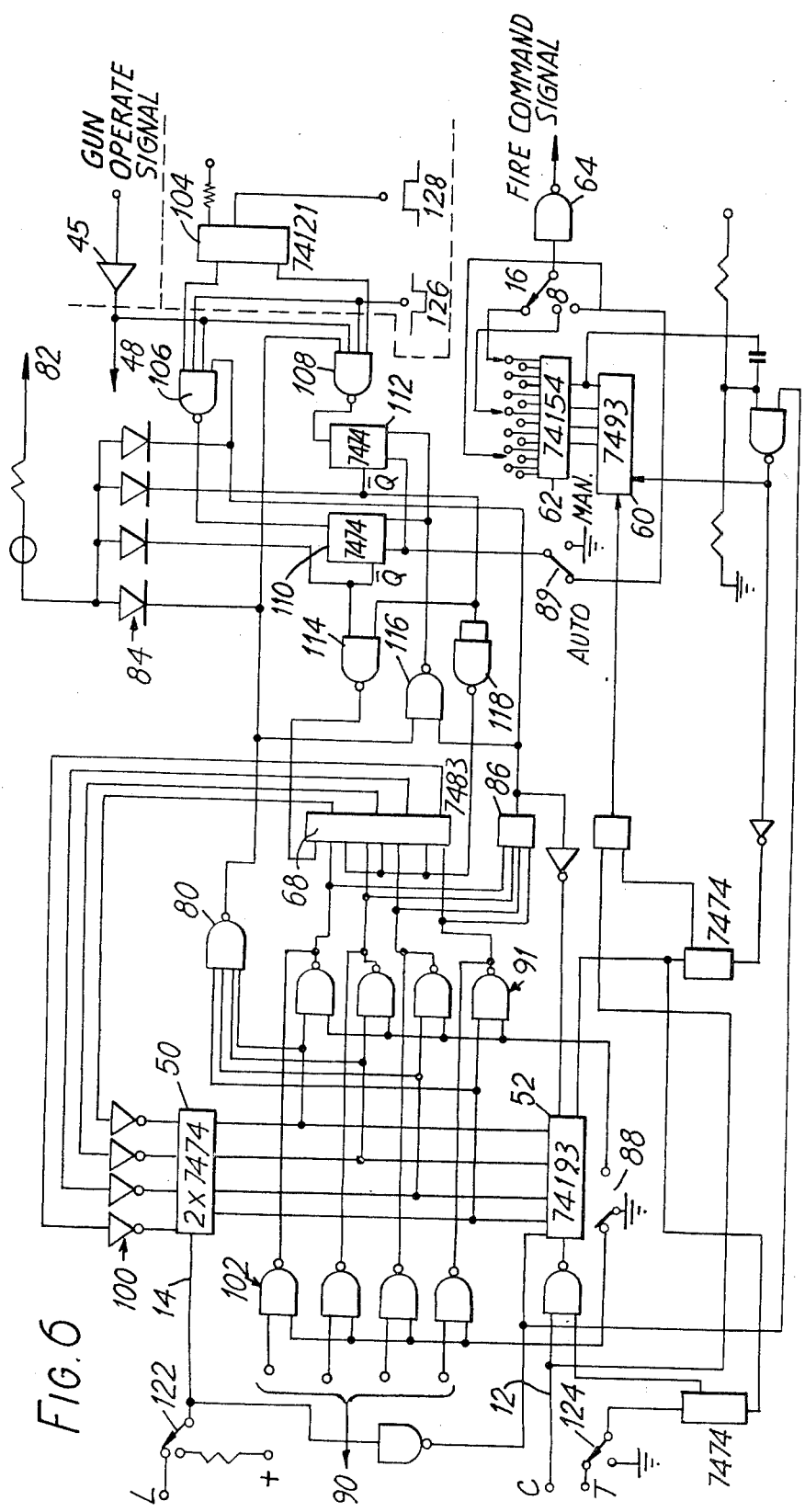
FIG. 6 is a circuit diagram showing in more detail a delay logic unit and some of its connections and associated parts.

The system shown includes a sequence control unit 10 (FIGS. 1 and 3) which provides signal pulses to initiate the firing of all the guns. It provides three outputs, referred to as "clock," "load" and "trigger," or "C," , "L" and "I,+ in the lines 12, 14 and 16, respectively, each of which lines is connected to a delay logic unit 18, one such unit being provided for each gun. FIG. 2 is a simplified circuit diagram of such a delay logic unit, while FIG. 6 gives an example of such a unit in more detail.

Figure 7:
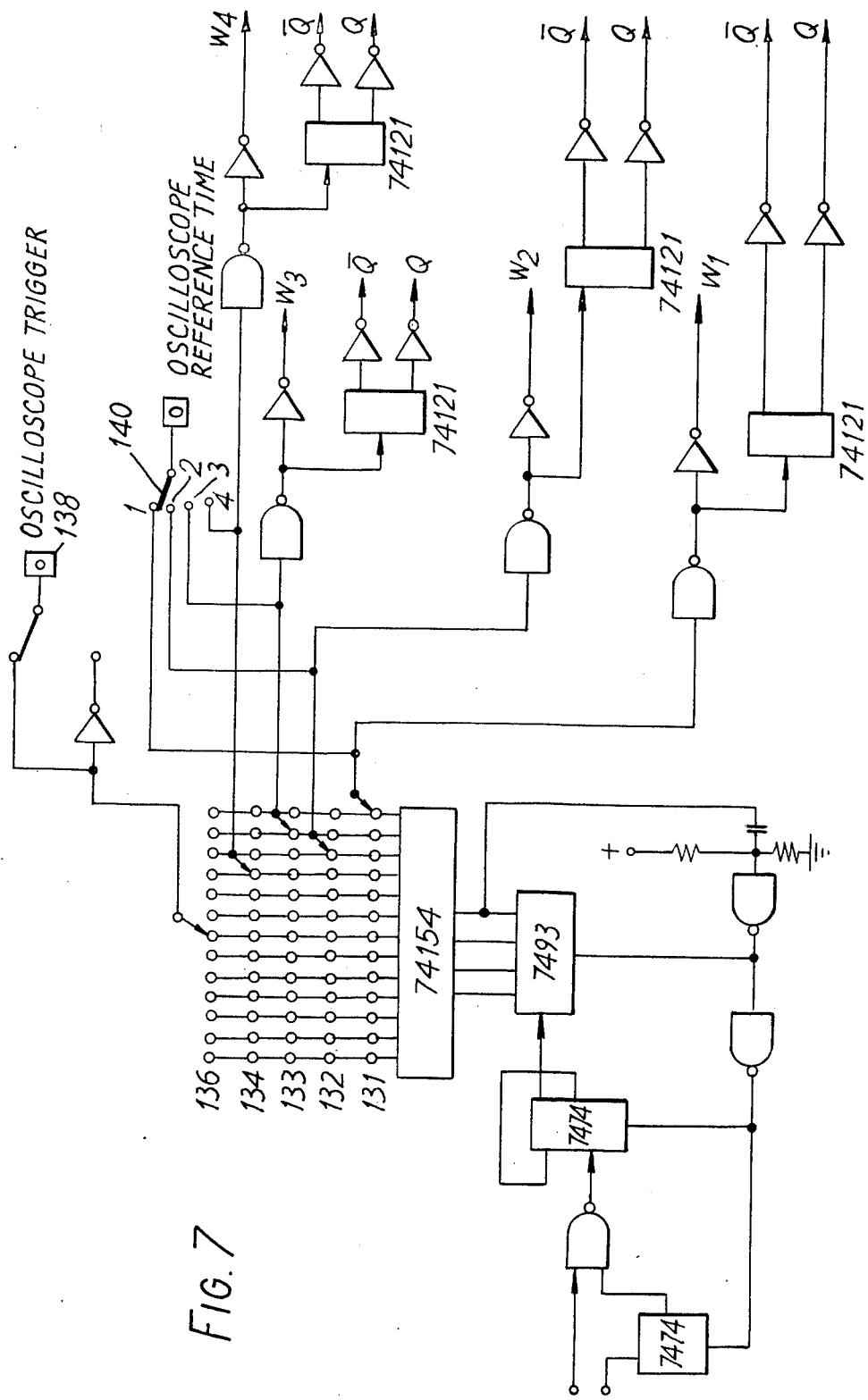
FIG. 7 is a block diagram showing a reference time card which may be used to enable the guns to be fired at predetermined intervals.

The trigger output T from unit 10 is also fed to the recorder 20 of the seismic system and to a clock gate 22, which it opens to allow the clock signal C to reach a reference time counter 24, which has a conventional form of reset circuit 26 and a decoder 28. The gate 22, reference time counter 24, reset 26 and decoder 28 form a reference time unit (referred generally as 29) one of which is provided to control all the guns. FIG. 7 (to be described) shows an example (which may be in the form of a reference time card) of such a unit with its outside connections and some associated parts.

Figure 3:
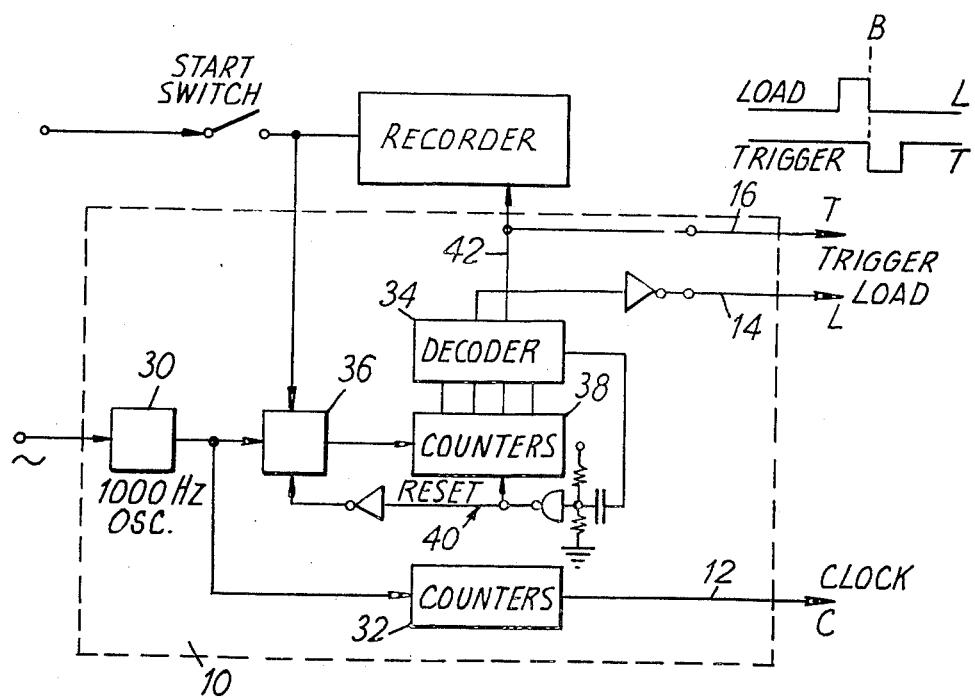
FIG. 3 is a block diagram showing the main parts of the sequence control unit of the apparatus and illustrates its operation.
Figure 4:
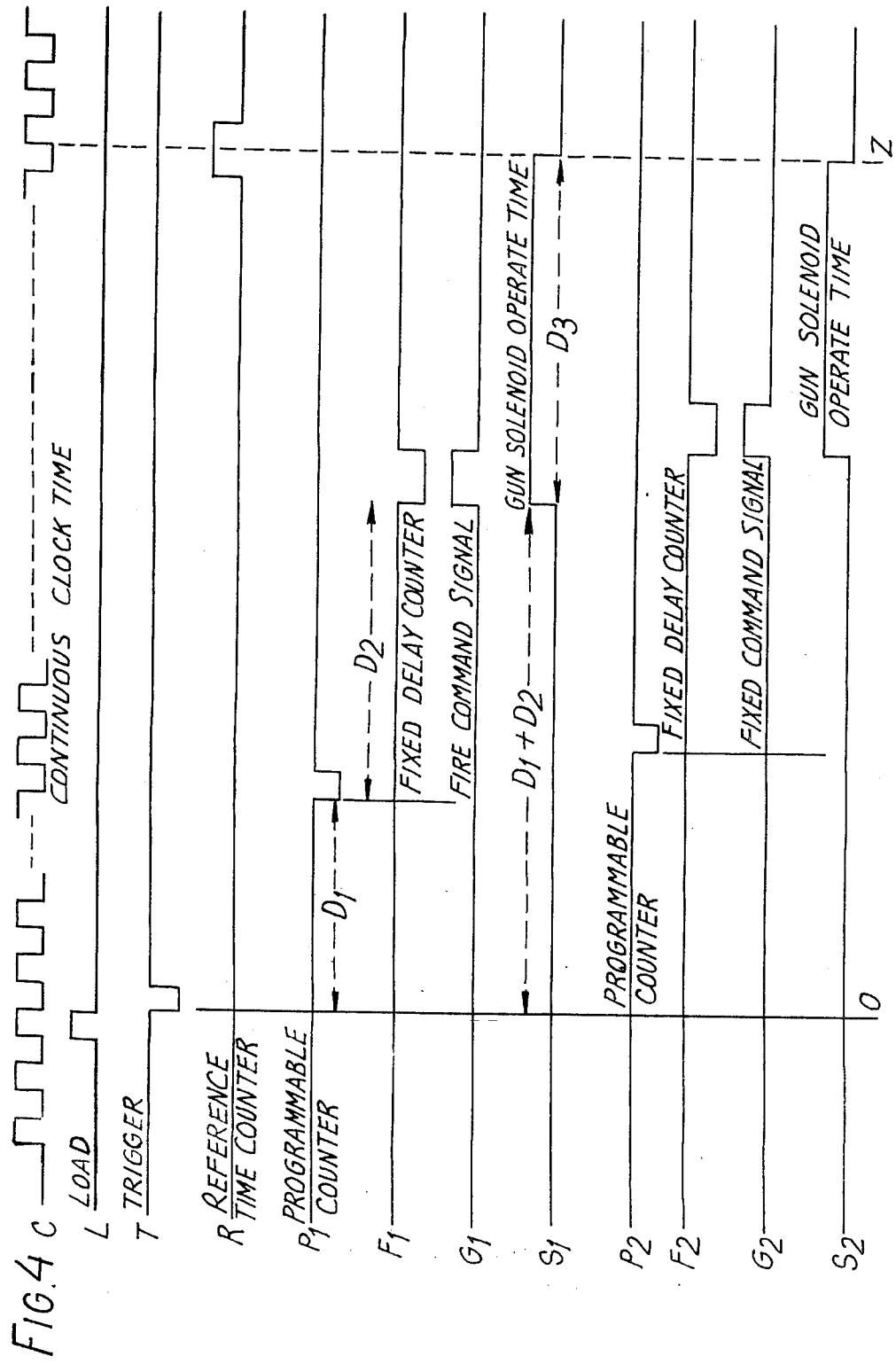
FIG. 4 is a pulse-time diagram showing times of various signal pulses.
Figure 5:
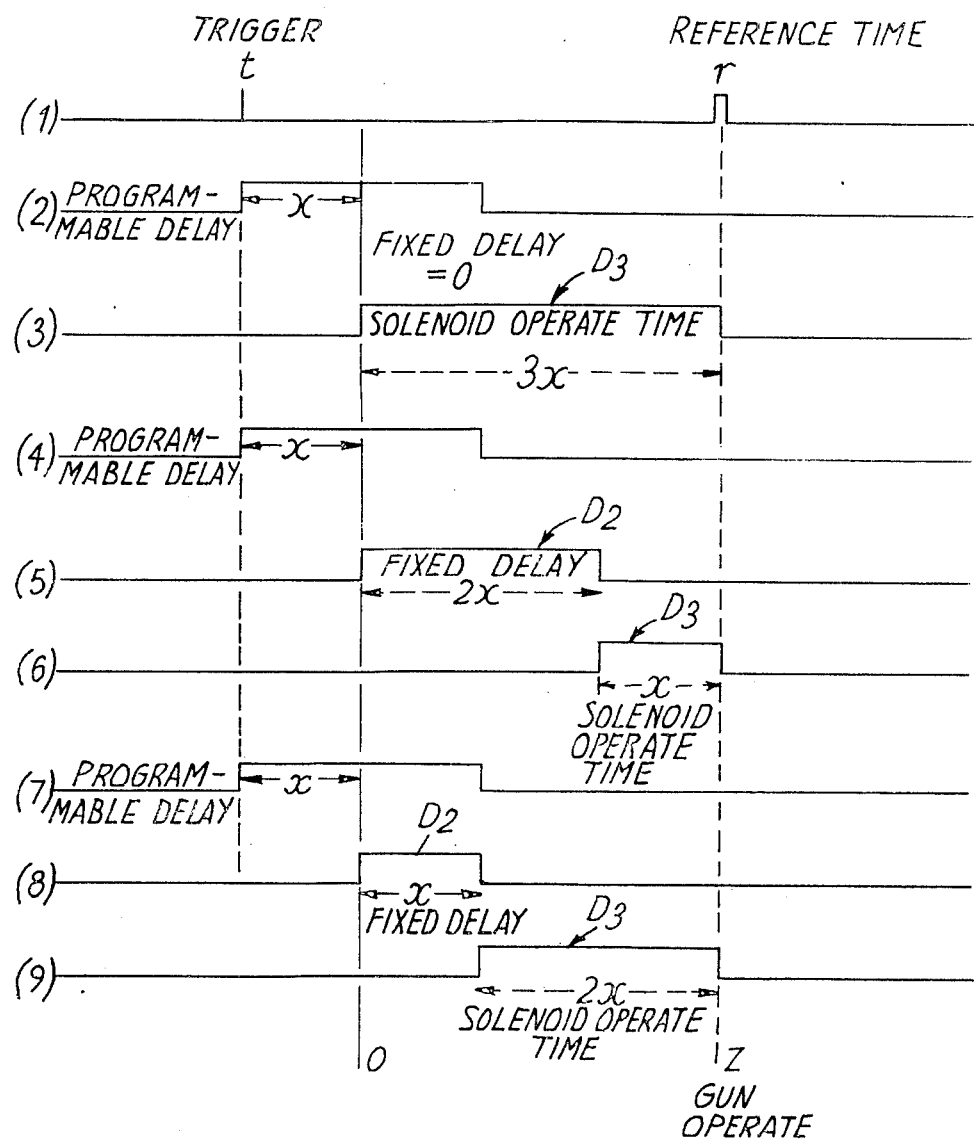
FIG. 5 is a pulse time diagram showing how differences between the inherent delays which occur between the different gun circuits can be compensated for by differences in fixed delay times.

As shown in FIG. 3, the sequence control unit 10, in this construction, includes a crystal oscillator 30, which provides at 12, through counters 32, a continuous pulse clock output C of, for example, 1000 Hz. It also has means, including a decoder 34, gate 36, counters 38 and reset 40, with necessary circuitry, to provide square-wave load and trigger pulses, as shown at L and T. They are also shown in FIGS. 4 and 5. These load and trigger pulses are each produced once between each firing of the guns, the trigger pulse T, which initiates this firing, following closely after the load pulse L. A "blast" or zero time signal, (signal B) is also supplied (FIG. 1) via line 42 to the recorder 20. This blast B is the start of the trigger pulse T, as is indicated graphically in FIG. 3 and also in FIG. 4.

Figure 1:
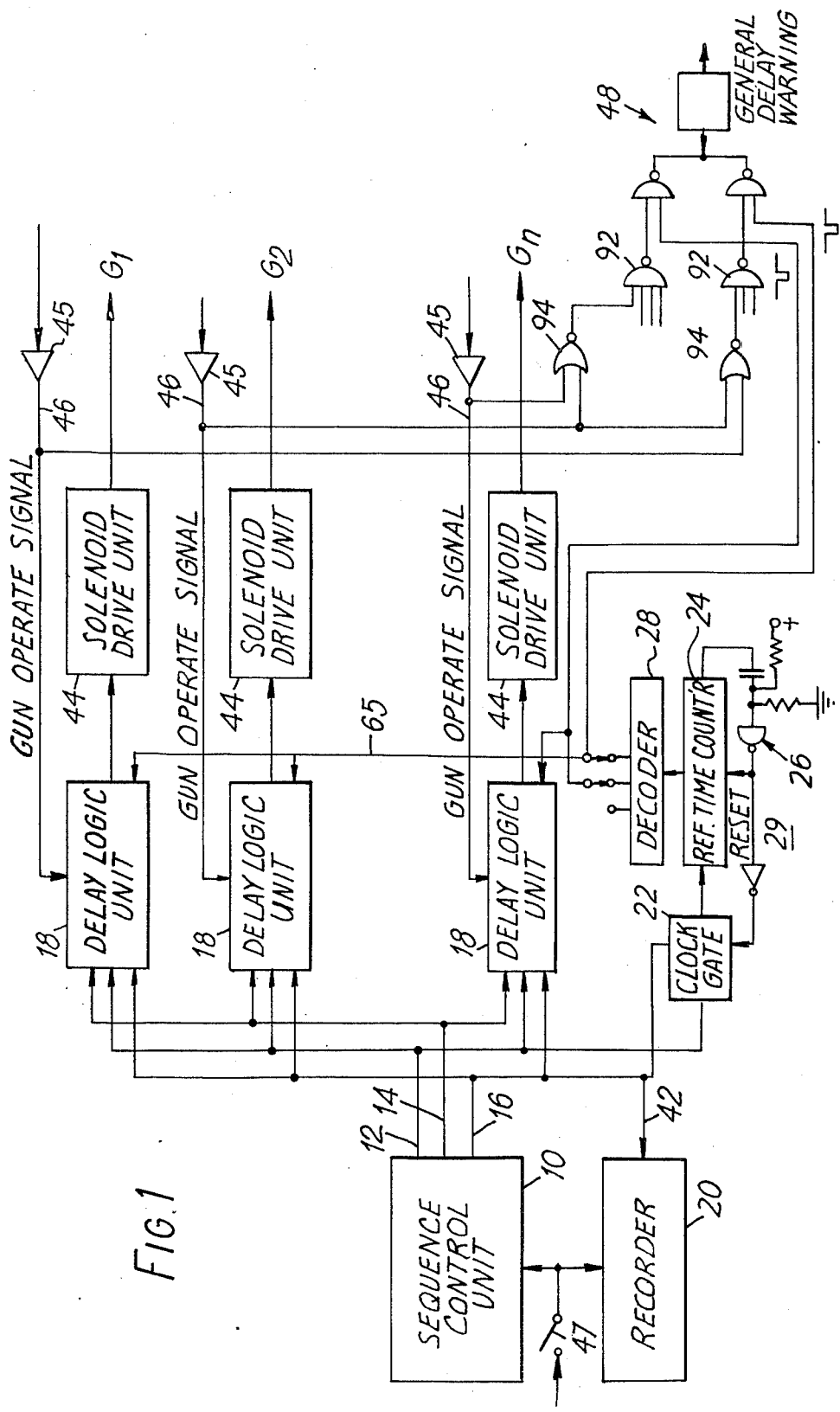
FIG. 1 is a block diagram showing in outline apparatus for controlling the firing of three air guns.
Figure 2:
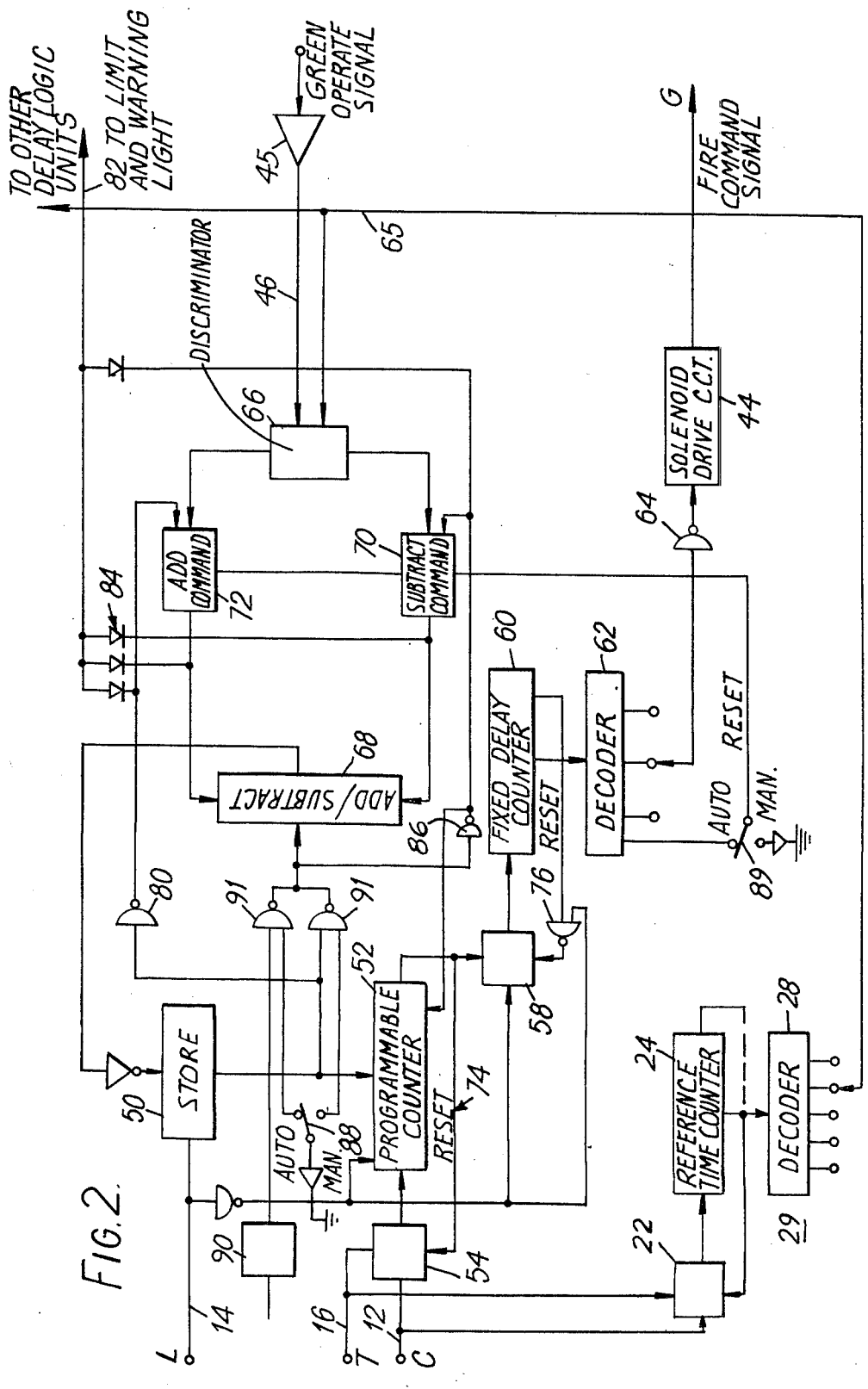
FIG. 2 is a block diagram showing the general circuitry of a delay logic unit which controls the firing of one air gun, together with some related circuitry.

As shown in FIG. 1 each delay logic unit 18 fires one of the guns by means of a solenoid drive unit 44, while the firing of a gun produces a gun operate signal which is fed back through its own amplifier, differentiator and shaper 45 and line 46 to the corresponding delay unit 18 to control its operation and the delay it will produce when firing the next stop, as will be described. Closing of a switch 47 (FIG. 1) starts the operation and it is the C, L and T pulses produced by unit 10 which cause the firing of the guns after the introduction of the required delays.

The lines 46 are also connected, as shown in FIG. 1, to a general warning system, indicated at 48.

FIG. 2 is a general block diagram showing the main circuitry of one of the delay logic units 18, with its more important connections and associated parts. An example of such a unit, as well as other parts of the apparatus and circuitry, are shown in more detail in other figures of the drawings, and will be described but for easier understanding of the invention a general description both of operation and circuitry will first be given with particular reference to FIGS. 1 and 2.

The first step in the firing of a gun after closing the switch 47 is the feeding of a single load pulse L by the sequence control unit 10 to all the delay logic units 18. In each unit 18 the pulse L is fed to a store 50 whereupon the store loads information into a programmable counter 52 as to a particular programmable time delay $D_1$. Immediately after the "load" pulse L, a "trigger" pulse T is fed on the "trigger" line 16 to the clock gate 22 and to another clock gate 54. It will be understood that all the pulses are fed simultaneously to all the gun circuits, but the clock gate 22 is a single gate common to all gun circuits.

Upon opening of the clock gates 22 and 54, the continuous clock pulse C is allowed to pass through these gates to the programmable counter 52, one of which is provided in each gun delay circuit 18, and also to the reference time counter 29 which is common to all gun circuits. When the clock pulse activates the counters 29 and 52, the programmable counter 52 starts a countdown of the delay time $D_1$, whilst the reference time counter 29 starts a countdown of a fixed or manually variable countdown time D, at the expiration of which it is intended that all guns should fire.

When the delay time $D_1$ ends the programmable counter opens a further clock gate 58 which enables the clock pulse to activate a fixed delay counter 60, which then commences countdown of a fixed delay time $D_2$. The delay counter 60 is not common, but one is provided one for each gun circuit. At the end of a delay time $D_2$, the fixed delay counter 60 activates its associated solenoid drive circuit 44 via a decoder 62 and gate 64. The associated air gun is thus fired after the further inherent delay time $D_3$, of the solenoid and the gun itself. A "gun operate" signal pulse which indicates the time the gun fired is then fed back to a discriminator 66 in the unit 18 via the line 46.

When the delay D has elapsed, the reference time counter 29 sends a pulse via line 65 to the discriminators 66 of all the delay units 18. If a gun is firing at the correct time its discriminator 66 should receive the pulse from the reference time counter 29 and the "gun operate" signal pulse simultaneously, in which case it gives no output signal to an add/subtract circuit comprising a full adder 68 in unit 18.

However, should the pulse from the reference time counter 29 arrive at one of discriminators 66 before the "gun operate" signal pulse, this discriminator will give, through circuitry 70 a "subtract" command to the adder 68 of the unit 18, whilst in the reverse circumstances the discriminator 66 will give an "add" command through circuitry 72 to adder 68. The output of the add/subtract circuitry 68 to 72 is fed from adder 68 into the store 50 which stores the variable time delay $D_1$. Depending on the information received from the adder 68, the delay time $D_1$ will be increased by one time unit if the gun fires too early, will remain the same if the gun has fired at the correct time, and will be decreased by one unit if the gun has fired late.

It will be apparent that when the apparatus is first step up, and a gun is firing at an incorrect time, this gun will approach more nearly the correct firing time by one time unit after each shot, until the firing time is correct, i.e., unit $D_1 + D_2 + D_3 = D$, whereafter the delay time $D_1$ will only be varied to compensate for a variation in the inherent delay time $D_3$.

As shown provision is made for resetting the various circuits where necessary, for instance, the clock gates 54 (reset 74) and 58 (reset 76) and the add/subtract circuit 68 – 72.

It is possible for a situation to occur in which the programmable counter 52 has reached a maximum or minimum possible time delay setting, and provision is made to indicate this condition. A multiple input gate 80 is connected to the output lines of the store 50, this gate 80 serving to detect a condition of "all ones" which occurs when the time set in the programmable counter 52 is a maximum. When a condition of "all ones" is detected, the output condition of the gate 80 then disables any further "add" commands being set, and all ones will circulate around the store. This condition would soon be observed because a light emitting diode indicator which is provided for each add/subtract circuit, to which it is connected at 82 through diodes 84, will stay illuminated.

A further multiple input gate 86 has its lines connected to the "Sum A" lines of the add/subtract adder 68, this gate being arranged to detect a condition of "all zeroes" which occurs when the programmable counter 52 is set for its minimum possible time delay. When this condition occurs, the output from the gate 86 disables any further subtract commands, and the light emitting diode again draws attention to the condition.

When a "maximum" or "minimum" time delay condition occurs on the programmable counter 52, adjustment can be made to the fixed delay counter 60 as appropriate.

When the apparatus is first set up, it is possible for the store 50, and thus the programmable counter 52, to be a long way out from the correct setting, and thus it would take some considerable time for this to be corrected automatically. It is mainly for this reason that provision is made to switch the apparatus from "automatic" to "manual". When switched to "manual" by switches 88 and 89, provided for this purpose, normal operation of the add/substract adder 68 is stopped and a time setting may be fed into the store 50 manually by a switch 90. This time setting would be approximately correct, and would be set by an operator observing the "gun operate" signal on an oscilloscope.

Once the approximate setting has been made, the system can be switched back to "automatic". The switch 90 and the store output are connected by gates 91 to the add/subtract circuit. One input of each gate 91 is connected to the switch 88, and the arrangement is such that either information from switch 90 or from the store output may be applied to the store input.

The provision for manual operation not only saves time during initial setting up of the apparatus, but also enables control to be passed back to the operator should any malfunction occur in any of the converter circuits which converts the "gun operate" signal pulse to a logic level.

As has been mentioned above, when the particular gun cannot fire at the correct time due to its programmable counter having reached a "maximum" or "minimum" condition, a light emitting diode associated with the circuit will indicate the gun responsible. However, a general warning system may also be provided, such as is shown at 48 in FIG. 1. Such a warning system may include a number of gates 92 wired to the "gun operate" signal lines 46 via gates 94. The gates 92 are also connected to one or more suitable reference time counters and the arrangement is such that when any "gun operate" signal outside the reference time occurs a general audible or visual warning device operates.

In FIG. 1 firing signals for three out of a total of $n$ guns are shown at $G_1$, $G_2$ and $G_n$. In practice there will be more guns, perhaps 40, each gun being fired by its solenoid drive unit 44 which is activated by the corresponding one of the delay logic units 18.

In operation, the output signals from the one sequence control unit 10 activate all the units 18 simultaneously and, after delays which may be different in each delay unit, each such unit activates its associated solenoid drive unit 44, and each gun is thus fired. The total delay between the output of a trigger pulse T and the firing of a particular gun is equal to the delay which occurs in the delay unit 18 associated with that gun, plus the inherent delay which is necessarily present in the solenoid drive unit 44 associated with the gun and that in the gun itself. As stated above, it has been found that these latter delays may vary slightly during continued use of the apparatus, and it is quite common for there to be considerable differences in the delay times of different solenoid drive units. The delay in each delay unit 18 is varied automatically at each firing in dependence upon whether its associated gun fired early or late at a previous firing.

FIGS. 4 and 5, show the relationship between the various delays and signals and their variations with time and how the different delays can be used to make the guns fire simultaneously. In FIG. 4:

C shows the 1000 Hz clock pulse;
L shows one of a succession of load pulse;
T shows the corresponding trigger pulse;
R shows one of the reference time pulses from unit 29;
$P_1$ shows the delay $D_1$ provided by the programmable counter 52 for one gun;
$F_1$ shows the fixed delay $D_2$ provided by the counter 60 for this gun added to the delay $D_1$;
$G_1$ shows the resulting fire command pulse which is produced after time $D_1 + D_2$;
$S_1$ shows the inherent solenoid delay time $D_3$ for this solenoid and gun, added to the times $D_1 + D_2$;
$P_2$, $G_2$ and $S_2$ are similar pulse-time graphs for a second gun;
Z is the firing time which is the same for both the guns once the apparatus has operated to make the total of the delays for the different guns equal, i.e., when $D_1 + D_2 + D_3$ is the same for all guns.

FIG. 5 is a diagram which is generally similar to FIG. 4 but which shows how three solenoids with very different operating times can be employed, using different fixed delay times while limiting the amount of extra correction which the different programmable delay units must provide. In FIG. 5 the successive lines show:

1. Trigger and reference times $t$ and $r$; respectively, the time between which is $D_1 + D_2 + D_3$ for all guns;
2, 4 and 7 possible programmable delays of up to $+x$ for each gun;
3 Fixed and programmable delays which are both zero when the solenoid operate time $D_3$ is $3x$;
5 and 6 A fixed delay $D_2$ of $2x$ and a programmable delay of zero when the solenoid time $D_3$ is $x$;
8 and 9 A fixed delay $D_2$ of $x$ and a programmable delay $D_1$ of zero when the solenoid delay $D_3$ is $2x$.
Z = all three guns will thus fire at a time $3x$ after the zero time 0.

Referring now to FIG. 6, this shows in more detail the circuit of a gun logic card which may be used for one of the delay logic units 18, with some of its associated parts and connections. Where appropriate the components shown in FIG. 6 are identified by the same references as in FIG. 2. Many of the components are of well-known coded types and where appropriate the code numbers are shown on the drawing; they indicate the following:

7474: Dual D type flip-flop with direct set and clear.
7483: Four bit full adder.
74193: Four bit programmable synchronous up/down counter.
7493: Four bit binary counter.
74154: Four line to 16 line decoder (Decodes each count of 7493).
74121: Monostable multivibrator or one shot.

The following is further information regarding these and other components, referring especially to FIG. 6.

The store 50 is formed of two 7474 units to provide four flip-flops. It is supplied from the adder 68 through invertors 100.

The gates 91 are provided by four wired-Or gates while the switch 90 is connected through a bank of Nand gates 102. These gates 91 and 102 allow information from either the switch 90, which is binary coded, and from the store 50 to be presented to the adder 68. Selection between these is effected by the switch 86.

The discriminator 66 is provided by a monostable vibrator or one shot 104 which is activated by the rear edge of the reference time pulse and which is connected through gates 106 and 108 to flip-flops 110 and 112. These latter are connected to further gates 114, 116, 118 to provide the add/subtract circuit as well as to gates 80 and 86 and to the manual automatic switch 89. They are also connected through diodes 84 to the warning light connection 82.

The action of the delay logic unit shown in FIG. 6 is as follows:

Before the referenced time the $\bar{Q}$ of the unit 104 will be true thus allowing one input of the lower gate 108. The reference time will also be true and, assuming a condition of "all ones" has not been detected by the upper unit of the gate 80 that input will also be true. Should the gun operate signal now occur the output of the lower gate 108 will go to zero, thus setting the early flip-flop section 112 and forcing both gates 114 and 118 to one. This puts all the ones on the sum B inputs to the adder 68, the output of which, after being inverted by the inverters 100, will be presented to the store 50 for entry on the next load command. When it is present at the output of the store 50 it will also be entered into the programmable counter 52.

Assuming the No. 5 was present at the input of the gate 80 (0101 in binary code) the sum A inputs to the adder 68 will be 1010. The sum B inputs will be 1111, giving 1001 at the output of the adder. This when inverted by the inverters 100 will present 0110 at the input of the store. In this way one has been added. Both the late and early sections 110 and 112 of the add/subtract circuit are reset before the issue of the next fire command.

For a gun operate signal which arrives after the end of the reference time the Q of the unit 104 will be a one, the reference time will also be a one and if a condition of all zeroes is not present the output of the gate 86 will also be a one. The gate 106 will go to zero, setting the late section flip-flop 110 and forcing the gate 114 to a one, thus putting 0001 on the sum B inputs to the adder 68. Again the output of the adder, inverted at 100 will be presented for entry into the store 50.

Considering another example, if the binary 5 (0101) is again present the sum A input to the adder will be 1010, the sum B will this time be 0001, thus giving 1011 at the output. After inversion by the inverters 100 the store input will be 0100 or 4 so that one has been subtracted.

It will thus be seen that a gun operate signal which arrives when the reference time is low will have no affect, the sum B lines will therefore be at zeroes and information from the store will pass unchanged for re-entry on the next load command.

The condition of maximum (1111) or minimum (0000) detected by 80 or 86 disables any further entries on the sum B lines and the stored value will recirculate unchanged. This condition will be indicated by a steady illuminated state of the diode connected to 82. The setting of either of the flip-flops 110 and 112 is also indicated by the same diode but the latter's action in this case will be intermittent.

In FIG. 6 switches 122 and 124 are shown, which enable L and T pulses to be supplied to decoder 50 and counter 52 when required, for example when setting up. The unit 104 is part of a reference time card which supplies positive and negative time pulses as indicated at 126 and 128.

The system described above is for use when all the guns are to fire simultaneously. It is however possible to arrange for the guns to fire at accurately determined spaced intervals.

In this case each gun circuit could have its own reference times decoded from the same reference time counter 29 and selected by switches and an example of how this could be done is shown in FIG. 7.

The decoder 28 has switches 131, 132, 133 and 134 to select desired reference times $W_1$ to $W_4$ for each gun or group of guns. The switches are shown in FIG. 7 as set to different times but if they were set to the same reference time all the guns would fire simultaneously.

137 is a selector switch which allows an oscilloscope 138 to be triggered early so that a reference time pulse may be displayed in the center of its screen. 140 is a selector switch which selects the reference time pulse which is to be displayed.

FIG. 8 shows how a logic level correction signal can be produced from the solenoid current waveform. This waveform is supplied to the circuit at 150 and the corrected signal is delivered at 152, the shapes and time relations of the signals being shown in FIGS. 8 and 8a. Details of the circuit and the waveforms at various stages are shown in FIG. 8 and will not be further described, except to mention that 154 is a connection to a reset circuit and 156 is a manually-operable reset switch.

In order to obtain the best results from this invention it is important that the "gun operate" signals or pulses should be accurately timed reference to the firing of the guns. Various ways are possible for doing this, besides the use of switches, relays, microphones or the like in or on the guns themselves.

One such method which can be used with air guns, particularly when these are in banks of more than one gun, makes use of changes in air pressure which occur in the air lines or manifolds which connect the individual guns to the compressor. The air in these lines is normally under the pressure of the compressor output but as each gun fires there is a drop in pressure in its line, the amount of this drop being a maximum near the gun and a minimum at the compressor. If a branch is provided for each gun manifold at the nearest convenient point to the gun and pressure-responsive switches or transducers are provided in the separate branches these will be operated to produce gun operate signals at the times when the individual guns fire.

Although we have shown the use of 4-bit counters the correction ranges are not limited by this, since the ranges can be increased by increasing the number of elements used. For example two or more adders 68 could be used to increase the range to 8 (or more) bits.

I claim:

1. Apparatus for affecting the firing of a number of energy sources, comprising a plurality of programmable counters adapted to initiate firing of said energy sources after programmable delays which are different for different sources, a reference time counter to provide a signal indicating a desired firing time or times, for said sources, comparator means to compare the actual firing times with said desired firing time or times and means for programming said programmable counters automatically in dependance upon information received from said comparator means to bring the actual firing times to the said desired firing time or times.

2. Apparatus according to claim 1 which comprises fixed delay counters connected to said programmable counters and means causing said fixed delay counters to be activated on expiration of the said programmable delays to initiate firing of said sources.

3. Apparatus according to claim 1 wherein the said comparator means comprises time storage means connected to said programmable counters and discriminator means adapted to give "time add" or "time subtract" demands to said time storage means on the receipt of signals representing actual firing times of the said sources so as to program said programmable counters.

4. Apparatus according to claim 1 which includes means for providing "load" "trigger" and "clock" pulses such that a load pulse fed to one of said time storage means causes the latter to load a program into its programmable counter and a trigger pulse following said load pulse causes clock pulses to be fed to said programmable counter and to said reference time counter.

5. Apparatus according to claim 1, wherein the said programming means operate after each firing of said energy sources in response to signals produced from said firing to increase or decrease said programmable delays by one unit of time after each said firing until the actual firing time agrees with the said desired firing time or times.

6. Apparatus according to claim 1, wherein switch means are provided the operation of which allows manual operation of the apparatus to bring said actual firing time or times closer to said desired firing time or times, continuance of this operation then being completed automatically by the apparatus.

7. Apparatus according to claim 1, wherein warning means are provided to indicate when a firing time is different from the desired firing time.

8. Apparatus according to claim 2 wherein means are provided for adjusting the delays caused by said fixed delay counters to reduce the range of operation needed from said programmable counters.

9. Apparatus according to claim 1, for use with air guns, wherein the apparatus includes means for producing the gun operate signals comprising, for each gun, a pressure responsive element which is connected to the individual air supply of that gun and is operated by the drop in air pressure caused by the firing of said gun.

10. Apparatus for affecting the firing of a number of energy sources, comprising,
a reference time counter to provide a signal indicating a desired firing time or times for said sources; and
a plurality of programmable delay means for initiating firing of different ones or groups of said energy sources, said programmable delay means comprising,
a programmable counter adapted to initiate firing of said one or group of energy sources after a programmable delay,
means for comparing the actual firing times with said desired firing time or times, and
means for programming said programmable counter automatically in response to said comparing means to bring the actual firing times to said desired firing time or times.

11. Apparatus according to claim 10 wherein said programmable delay means further comprises a fixed delay counter connected to said programmable counter and means for activating said fixed delay counter upon expiration of said programmable delay to initiate firing of said source or group of sources.

12. Apparatus according to claim 10 wherein said programming means further comprises time storage means for programming said programmable counter and wherein said comparing means further comprises discriminator means responsive to said actual firing times for generating "time add" or "time subtract" signals effective to control said time storage means.

13. Apparatus according to claim 12 wherein said discriminator means further comprises digital combining means for combining said "time add" or "time subtract" signals and said time storage means programming signal, said combined signal controlling said time storage means to change said programmable counter delay for the next successive firing of said energy sources.

14. Apparatus according to claim 13 wherein said combining means further comprises means for generating a binary number resulting from a binary combination of said "time add" and said "time subtract" signals and digital binary adder means for adding the inverted result of said time storage means programming signal at a first input and said binary number from said generating means at a second input, the inverted output of said binary adder means connected to said time storage means to provide a binary number which is the programming signal to be outputted to said programmable counter upon the next successive firing of said energy sources.

15. Apparatus according to claim 14 wherein said binary number from said generating means is a binary one when said "time add" signal is active and is a number which is one less in binary form than the maximum binary number that is capable of being entered in said binary adder means when said "time subtract" signal is active.

16. Apparatus according to claim 14 wherein said binary adder means is effective to increase said time storage programming signal by one binary number when said "time add" signal is active and effective to decrease said time storage programming signal by one binary number when ssaid "time-subtract" signal is active.

17. Apparatus according to claim 16 wherein said binary adder means maintains said time storage programming signal at the same binary number when said reference signal of said reference time counter occurs within a predetermined time interval before or after said actual firing time.

* * * * *